(No Model.)
J. M. HUNTER.
COFFEE MILL.
No. 379,167.                                   Patented Mar. 6, 1888.
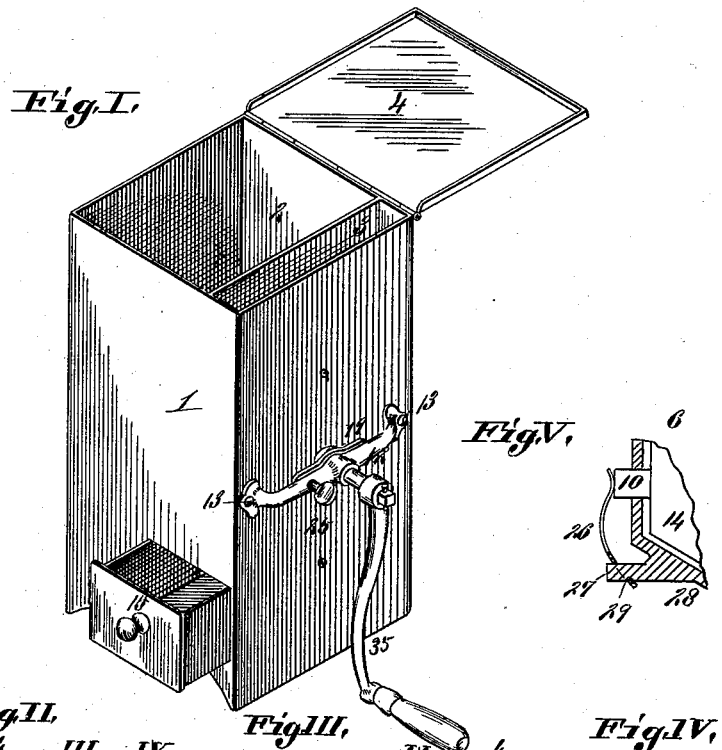
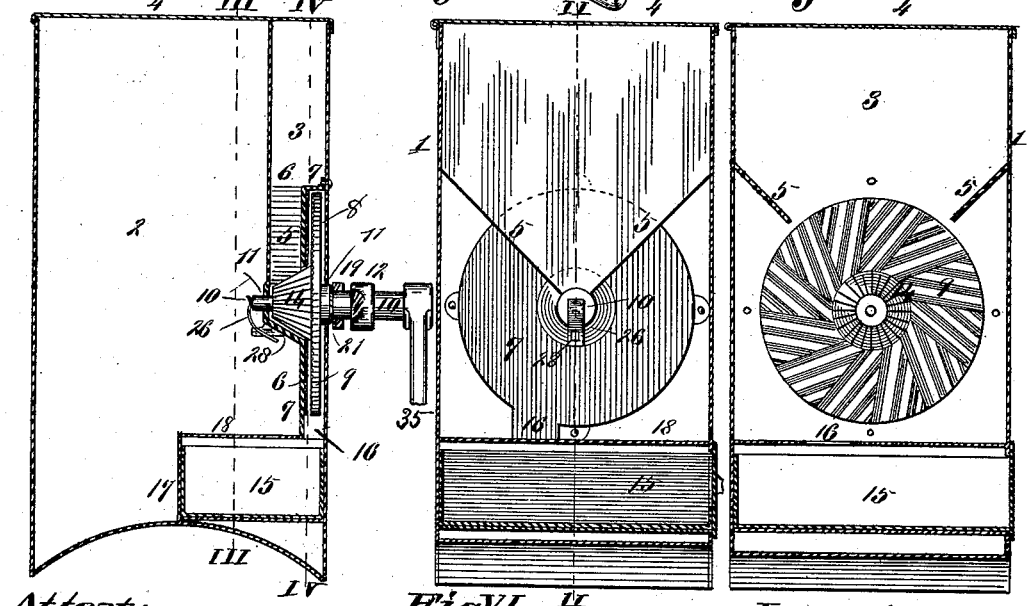
Attest:
Edward Stern
Emma Arthur
Inventor:
Jas. M. Hunter.
By Knight Bros
Attys.

UNITED STATES PATENT OFFICE.

JAMES M. HUNTER, OF ST. LOUIS, MISSOURI, ASSIGNOR OF ONE-HALF TO CHARLES A. SIEBERT, OF SAME PLACE.

COFFEE-MILL.

SPECIFICATION forming part of Letters Patent No. 379,167, dated March 6, 1888.

Application filed March 12, 1887. Serial No. 230,679. (No model.)

*To all whom it may concern:*

Be it known that I, JAMES M. HUNTER, of the city of St. Louis, in the State of Missouri, have invented certain new and useful Improvements in Coffee-Mills, of which the following is a full, clear, and exact description, reference being had to the accompanying drawings, forming part of this specification, and in which—

Figure I is a perspective view of my improved mill, showing the lid open and a drawer partially pulled out. Fig. II is a vertical longitudinal section taken on line II II, Fig. III. Fig. III is a similar view taken on line III III, Fig. II. Fig. IV is a similar view taken on line IV IV, Fig. II. Fig. V is an enlarged detail view illustrating the form of spring for moving the rotary disk back from the fixed one, and also illustrating the manner of securing this spring in place. Fig. VI is an enlarged transverse section showing the device for adjusting the rotary disk to or from the fixed disk.

My invention relates to certain improvements in coffee-mills; and it consists in features of novelty, hereinafter fully described, and pointed out in the claims.

Referring to the drawings, 1 represents a case in which is a large compartment, 2, for receiving and holding the unground coffee, and a smaller compartment, 3, into which the portion of the coffee to be ground at any one time is placed, and which communicates at its lower end with the grinding-disks of the machine. The case is provided with a cover, 4, hinged thereto for closing the compartments at top. The lower portions of the ends of the compartment 3 are made inclined, as shown at 5, Figs. II, III, and IV, which directs the coffee to the center of the grinding-disks.

6 represents a fixed disk, which is secured to a plate, 7, secured to the outside wall of the compartment 3, as shown in Fig. II, the plate leaving a space, 8, between it and the outer wall of the compartment, in which is located the rotary or movable disk 9, secured to a shaft, 10, journaled in the outer and inner walls of the compartment 3, as shown at 11, and also in a bridge, 12, secured to the outer wall by rivets or bolts 13. The rotary disk has a central cone-shaped projection, 14, which enters a central opening in the fixed disk, as shown in Fig. II, and which acts to carry the coffee outward into the grinding-space between the disks.

The shaft 10 is provided with a turning-crank, 35, by which it is operated, and as the coffee is ground it falls into a drawer, 15, at the lower part of the case, the drawer communicating with the disk-chamber 8 through a spout, 16. The drawer-chamber is separated from the compartment 2 by means of a vertical plate, 17, and a horizontal plate, 18, the latter being joined to the plate 7 of the fixed disk 6. (See Fig. II.)

As a means for adjusting the rotary or movable disk toward the fixed disk I have shown a lever, 19, which has a central opening, 20, (see Fig. VI,) to receive the shaft 10, and which bears at its center against an enlargement, 21, on the shaft. (See Figs. II and VI.) One end of the lever is provided with a rounded projection, 22, fitting in a recess, 23, of the bridge 12, and the other end bears against a set-screw, 24, which passes through the bridge 12, and is provided with a thumb-piece, 25, on its outer end. It will thus be seen that by turning on the screw 24 the movable disk will be forced toward the fixed disk, the projection 22 of the lever rocking in the recess 23 in the bridge.

When it is desired to grind coarser, the thumb-screw 24 is turned outward, and the movable disk is forced from the fixed disk by means of a spring, 26. (See Figs. II, III, and V.) The free end of this spring bears against the inner end of the shaft 10, and it is supported by a projection, 27, secured to the inner wall of the compartment 3, as shown at 28. The spring is provided with an opening fitting over the projection 27, and the projection has a notch or recess, 29, into which the lower end of the spring fits to hold it from horizontal movement. The spring is thus quickly and cheaply secured in place, and will act to move the rotary disk as the set-screw 24 is turned outward.

The adjacent faces of the grinding-disks are suitably furrowed.

I claim as my invention—

1. In a grinding-mill, the combination of a suitable casing, the circular flanged plate 7, secured thereto and forming therewith a chamber, 8, the fixed grinding-disk 6, secured to the plate 7, the movable grinding-disk 9, shaft 10, to which the disk 9 is secured, the outlet 16 in the lower part of the said chamber 8, and the crank secured to said shaft, plate 7 and disk 6 being perforated for the passage of the shaft 10, substantially as and for the purposes set forth.

2. In a coffee-mill, the combination of the case 1, formed with the compartments 2 3, a plate, 7, secured to the casing and forming a chamber, 8, a fixed disk, 6, secured to said plate 7, a disk, 9, fitted in said chamber and having a conical projection, 14, a revoluble shaft, 10, to which said disk 9 is secured, having a projection, 21, a spring, 26, bearing against the inner end of the shaft, a bridge, 12, through which the shaft passes, a lever, 19, perforated for the passage of the shaft, bearing against the bridge and also against the projection 21, a set-screw bearing against the lever, and a handle secured to the shaft 10, all constructed and arranged to operate substantially as and for the purpose set forth.

3. In a coffee-mill, the combination of the fixed and rotary disks, a casing in which said disks are located, a shaft to which the rotary disk is secured, having a crank for turning it and a projection, a bridge secured to the casing and through which the shaft passes, a lever bearing against said projection and having at one end a rounded projection fitting in a recess in said bridge, and a set-screw passing through said bridge and bearing against the free end of said lever, substantially as set forth.

JAMES M. HUNTER.

In presence of—
 JAS. E. KNIGHT,
 EDW. S. KNIGHT.